US009383751B2

(12) United States Patent
Lee (10) Patent No.: US 9,383,751 B2
(45) Date of Patent: Jul. 5, 2016

(54) SELF OPERABLE WHEELCHAIR (71) Applicant: MEDICRAFT HOLDINGS (TAIWAN) CO., LTD., Taipei (TW)

(72) Inventor: Tun-Chi Lee, New Taipei (TW)

(73) Assignee: MEDICRAFT HOLDINGS (TAIWAN) CO., LTD., Taipei (TW)

( * ) Notice: Subject to any disclaimer, the term of this patent is extended or adjusted under 35 U.S.C. 154(b) by 0 days.

(21) Appl. No.: 14/858,198

(22) Filed: Sep. 18, 2015

(65) Prior Publication Data
US 2016/0008191 A1    Jan. 14, 2016

Related U.S. Application Data (63) Continuation-in-part of application No. 14/338,405, filed on Jul. 23, 2014, now abandoned.

(30) Foreign Application Priority Data

Dec. 12, 2013   (TW) .............................. 102145951 A (51) Int. Cl.
G05D 1/02    (2006.01)
A61G 5/04    (2013.01)
A61G 5/10    (2006.01)
A61G 5/12    (2006.01)

(52) U.S. Cl.
CPC *G05D 1/021* (2013.01); *A61G 5/04* (2013.01); *A61G 5/1002* (2013.01); *A61G 5/1059* (2013.01); *A61G 5/12* (2013.01); *G05D 1/0261* (2013.01); *A61G 2005/125* (2013.01); *A61G 2005/127* (2013.01); *A61G 2203/12* (2013.01); *A61G 2203/22* (2013.01); *G05D 2201/0206* (2013.01)

(58) Field of Classification Search
CPC ....... A61G 5/041; A61G 5/1002; A61G 5/12; A61G 5/1059; A61G 2005/125; A61G 2005/127; G05D 1/0212
See application file for complete search history.

(56) References Cited

U.S. PATENT DOCUMENTS

| 5,155,684 | A  | 10/1992 | Burke et al. |
| 6,135,228 | A  | 10/2000 | Asada et al. |
| 6,220,616 | B1 | 4/2001  | Finch |
| 6,834,220 | B1 | 12/2004 | Bail |
| 2004/0006422 | A1 | 1/2004  | Fehr et al. |
| 2010/0156064 | A1 | 6/2010  | Johnson et al. |
| 2012/0046821 | A1 | 2/2012  | Pettersson et al. |
| 2012/0143393 | A1 | 6/2012  | Peters et al. |
| 2013/0113263 | A1 | 5/2013  | Yamada et al. |
| 2014/0018994 | A1 | 1/2014  | Panzarella et al. |

FOREIGN PATENT DOCUMENTS

| JP | H119625 A   | 1/1999 |
| JP | 2002341939 A | 11/2002 |

*Primary Examiner* — Michael J Zanelli
(74) *Attorney, Agent, or Firm* — Rabin & Berdo, P.C.

(57) ABSTRACT

A self operable wheelchair includes a chair body having several wheels for moving about; a power module electrically connected to one wheel of the chair body for supplying power; a processing module electrically connected to the power module for processing one route data and converting into a control signal transmitted to the power module for controlling activation of the chair body; a memory module for storing and transmitting the route data to the processing module; a detection module capable of detecting the route data of the chair body and transmitting the route data via the processing module to store within the memory module; and an operation module for transmitting an operation signal to the processing module, which, in turn, activates the chair body based on the operation signal.

14 Claims, 13 Drawing Sheets

SELF OPERABLE WHEELCHAIR

CROSS-REFERENCES TO RELATED APPLICATION

This is a continuation-in-part of U.S. application Ser. No. 14/338,405, filed on Jul. 23, 2014, which is incorporated herewith by reference.

BACKGROUND OF THE INVENTION

1. Field of the Invention

The present invention relates generally to a wheelchair, and more particularly to a self operable wheelchair and the system thereof.

2. The Prior Arts

There are two types of conventional wheelchairs, wherein one is manually operated while the other one is mechanically operated. The mechanically operated wheelchair is not discussed herein. There is yet another type of wheelchair, namely battery operated wheelchair, which traveling direction is determined by the operator, that is the seated person in the wheelchair and motors drive wheels to rotate and the power for the motor is supplied by the battery.

Since the conventional battery operated wheelchair requires the rider to manipulate the operation knob, it brings several inconveniences for those disabled persons, like suffering from muscle atrophy, arthritis or spinal cord damage. Owing to the reasons that severely disabled persons cannot operate the operation knob manually and conveniently, undesired accidents may occur and hence leading to dangerous environment when using the conventional battery operated wheelchair. Even if the disabled person can operate the wheelchair with great difficulties, encountering the undesired accidents is still unavoidable.

SUMMARY OF THE INVENTION

For those severely disabled persons having difficulties to operate the wheelchair, a wide range of scope is still possible for every inventor to develop a self operable wheelchair.

A primary objective of the present invention is to provide a self operable wheelchair that includes: a chair body having a plurality of wheels for moving about, a seat, a pair of armrests, a backrest, a frame and a toilet access, wherein the seat is adapted to be seated over a toilet once the toilet is received in the toilet access; a power module electrically connected to at least one of the wheels for supplying power to move the chair body; a processing module electrically connected to the power module for processing at least one route data and converting the same into a control signal transmitted to the power module for controlling activation of the chair body; a memory module electrically connected to the processing module for storing and transmitting the route data to the processing module; a detection module electrically connected to the processing module and capable of detecting the route data of the chair body and transmitting the route data via the processing module so as to store within the memory module; and an operation module electrically connected to or remotely connected to the processing module for directly transmitting an operation signal to the processing module, which, in turn, activates the chair body based on the operation signal.

In the above wheelchair, an operation mode of the power module is detected by the detection module while the processing module is capable of storing at least one the route data within the memory module so as to permit the operation module to select a respective one of the route data from the memory module for transmitting the control signal corresponding to the respective one of the route data to the power module such the chair body is driven based on the route data.

Preferably, the seat is operable by the processing module in such a manner to uncover and expose the toilet access or rotatable relative the frame so as to be lifted upward from the frame.

To be more specific, the seat has left and right seat parts disposed side by side above the frame and are adapted to be separated relative to each other along a horizontal direction so as to expose the toilet access. Under this condition, the user can use the toilet.

In addition, the armrests are movable relative to the backrest manually or via the process module.

To be more specific, the armrests are movable relative to the backrest between a first position, where the armrests extend perpendicularly and outwardly from the backrest and a second position, where the armrest are generally flush with the backrest. Under this condition, the user can take a bath similar to an ordinary person.

Preferably, the seat has a front end connected pivotally to the frame and a rear end connected pivotally to the backrest. The frame further includes first and second lifting structures installed at a predetermined position of the chair body such that the first and second lifting structures are adapted to be activated by the processing module to align the seat and the backrest relative to each other. Under this condition, the back of the disabled person is supported by the assembly of the seat and the backrest so as to permit standing.

In this embodiment, the power module further includes a first power module and a second power module. The plurality of wheels includes a first pair of wheels operable by the first power module and a second pair of wheels operable by the second power module via the detection module.

A self operable wheelchair system of the present invention includes: a chair body having a plurality of wheels for moving about, a seat, a pair of armrests, a backrest, a frame and a toilet access, wherein the seat is adapted to be seated over a toilet once the toilet is received in the toilet access; a power module electrically connected to at least one of the wheels for supplying power to move the chair body; a processing module electrically connected to the power module for processing at least one route data and converting the same into a control signal transmitted to the power module for controlling activation of the chair body; a memory module electrically connected to the processing module for storing and transmitting the route data to the processing module; a detection module electrically connected to the processing module and capable of detecting the route data of the chair body and transmitting the route data via the processing module so as to store within the memory module; an operation module electrically connected to or remotely connected to the processing module for directly transmitting an operation signal to the processing module, which, in turn, activates the chair body based on the operation signal; and a position correcting module capable of defining an initial position of the chair body. The detection module detects the position correcting module to memorize the initial position of said chair body.

In the above wheelchair system, the processing module is capable of sensing an operation mode of the power module through the detection module and recognizing the initial position of the chair body through the detection module to detect the position correcting module and combining both so as to form the route data and storing in the memory module. The operation module is capable of selecting a respective one of the route data from the memory module for transmitting the control signal corresponding to the respective one of the route data to the power module such the chair body is driven based on the respective one of the route data, thereby permitting entry of the toilet into the toilet access such that the seat is seated over the toilet.

Preferably, the seat is operable by the processing module in such a manner to uncover and expose the toilet access or rotatable relative the frame so as to be lifted upward from the frame.

To be more specific, the seat has left and right seat parts disposed side by side above the frame and are adapted to be separated relative to each other along a horizontal direction so as to expose the toilet access. Under this condition, the user can use the toilet.

In addition, the armrests are movable relative to the backrest manually or via the process module.

To be more specific, the armrests are movable relative to the backrest between a first position, where the armrests extend perpendicularly and outwardly from the backrest and a second position, where the armrest are generally flush with the backrest. Under this condition, the user can take a bath similar to an ordinary person.

Preferably, the seat has a front end connected pivotally to the frame and a rear end connected pivotally to the backrest. The frame further includes first and second lifting structures installed at a predetermined position of the chair body such that the first and second lifting structures are adapted to be activated by the processing module to align the seat and the backrest relative to each other. Under this condition, the back of the disabled person is supported by the assembly of the seat and the backrest so as to permit standing.

In this embodiment, the operation module further includes a remote control compatible with one of WIFI, infrared, Bluetooth wireless systems for establishing communication with the chair body.

Preferably, the position correcting module includes at least one magnetic stone. The detection module is an electromagnetic sensing element and is capable of detecting varying magnetic field of the magnetic stone of the position correcting module.

Preferably, the position correcting module includes a first tape and a second tape. The detection module includes a first color standard sensor disposed at a rear end of a seat support of the frame close to a first rear wheel of the chair body, and a second color standard sensor disposed at the rear end of the seat support of the frame close to a second rear wheel of the chair body. The first color standard sensor detects the first tape and transmits a signal to the processing module to control the power module to stop the first rear wheel of the chair body rotating and drive the second rear wheel of the chair body to rotate, until the second color standard sensor detects the second tape and transmits a signal to the processing module to control the power module to drive the first rear wheel of the chair body to rotate again thereby moving the chair body toward the initial position straight ahead.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Figure 1:
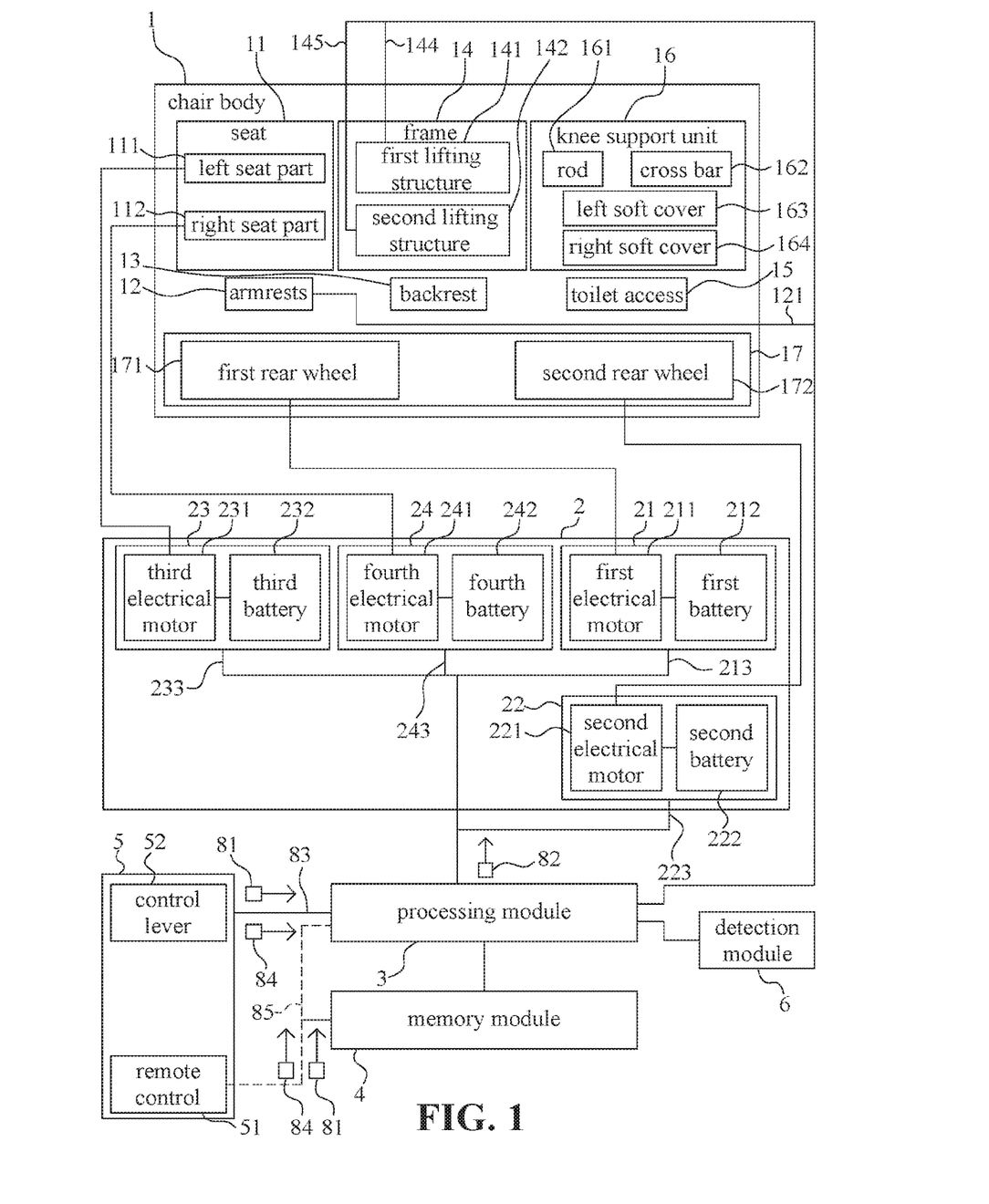
FIG. 1 shows a diagram representing elements of a self operable wheelchair of the present invention.
Figure 2:
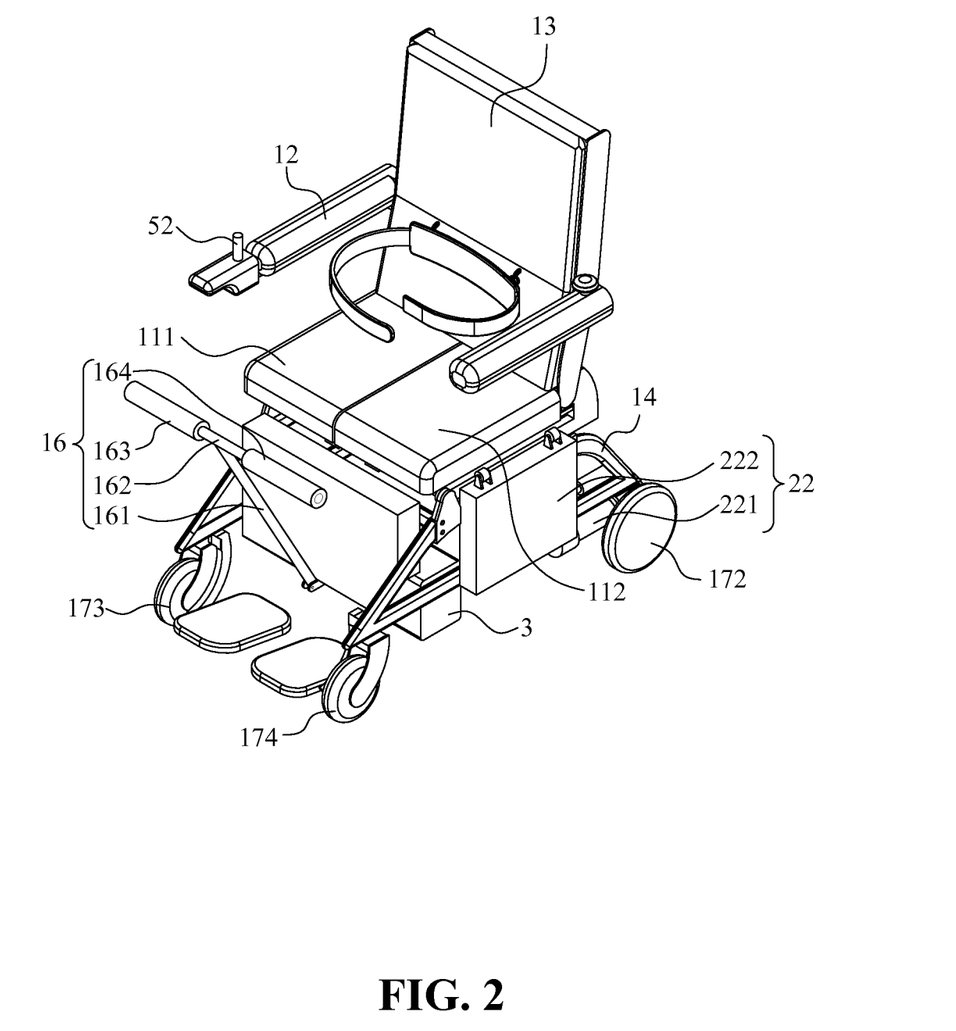
FIG. 2 shows a perspective view of the self operable wheelchair of the present invention.
Figure 3:
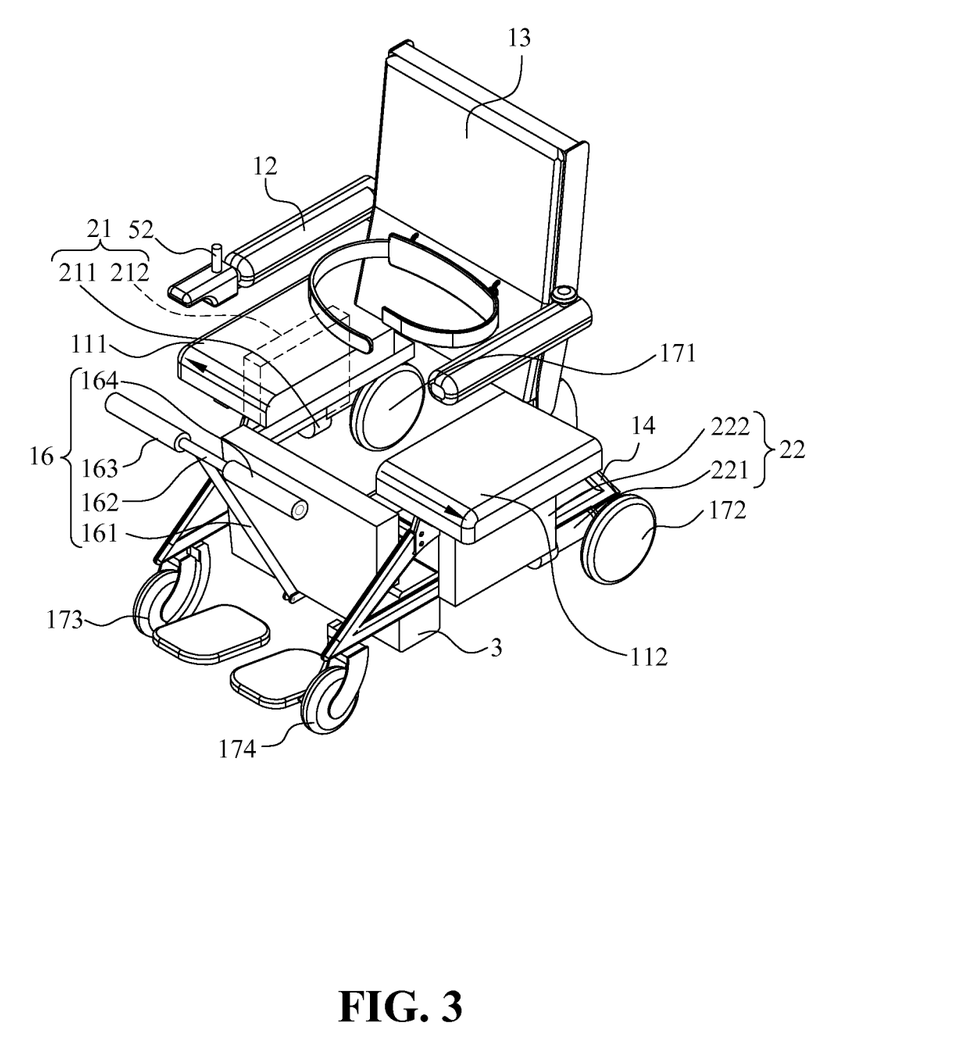
FIG. 3 shows a perspective view of the self operable wheelchair of the present invention, in which a toilet access of the wheelchair is exposed.
Figure 4:
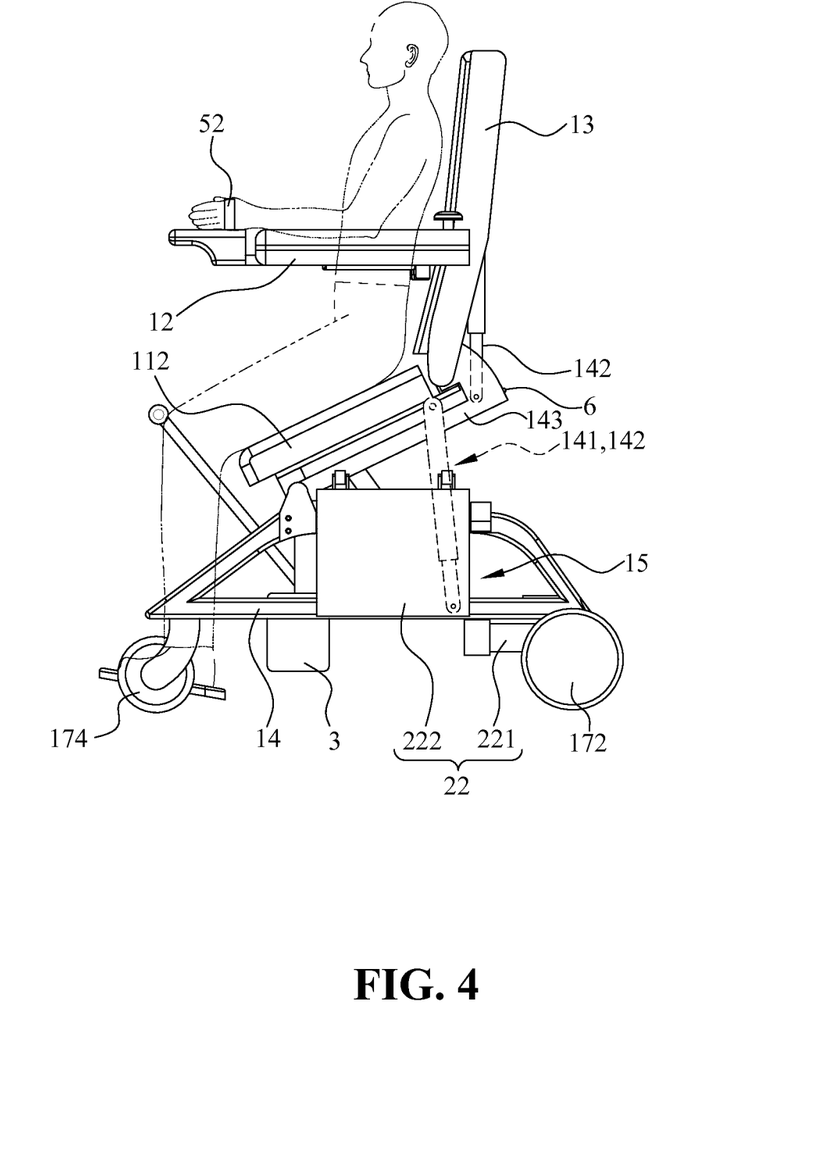
FIG. 4 shows a lateral side view of the self operable wheelchair of the present invention, in which first and second lifting structures are shown in use.

Referring to FIGS. 1~4, wherein FIG. 1 shows a diagram representing elements of a self operable wheelchair of the present invention; FIG. 2 shows a perspective view of the self operable wheelchair of the present invention; FIG. 3 shows a perspective view of the self operable wheelchair of the present invention, in which a toilet access of the wheelchair is exposed; and FIG. 4 shows a lateral side view of the self operable wheelchair of the present invention, in which first and second lifting structures are shown in use.

As best shown in FIGS. 1 and 2, the self operable wheelchair of the present invention includes a chair body 1, a power module 2, a processing module 3, a memory module 4, a detection module 6 and an operation module 5.

Figure 8:
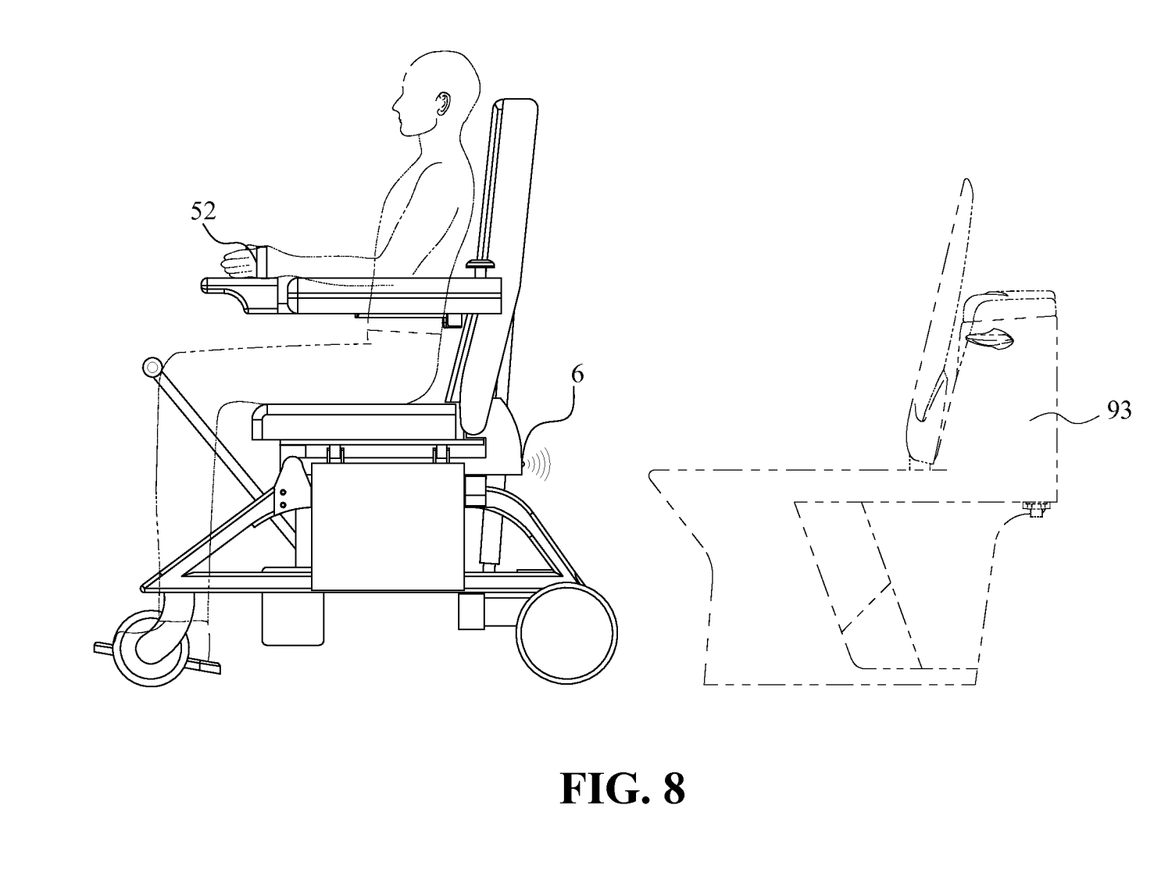

The chair body 1 includes a plurality of wheels 17 for moving about, a frame 14, a seat 11 and a backrest 13 mounted on the frame 14, a pair of armrests 12 mounted pivotally on the backrest 13, and a toilet access 15, wherein the frame 14 defines the toilet access 15 below the seat 11 such that the seat 11 is adapted to be located over a toilet 93 once the toilet 93 is received in the toilet access 15 by moving the wheelchair as shown in FIG. 8.

The power module 2 is electrically connected to at least one of the wheels 17 for supplying power to move the chair body 1.

The processing module 3 is electrically connected to the power module 2 for processing at least one route data 91 and converting the same into a control signal 82 transmitted to the power module 2 for controlling activation of the chair body 1.

The memory module 4 is electrically connected to the processing module 3 for storing and transmitting the route data 91 to the processing module 3.

The detection module 6 is electrically connected to the processing module 3 and is capable of detecting the route data 91 of the chair body 1 and transmits the route data 91 via the processing module 3 so as to store within the memory module 4.

The operation module 5 is electrically connected to or remotely connected to the processing module 3 for directly transmitting an operation signal 81 to the processing module 3, which, in turn, activates the chair body 1 via the gear mechanism based on the operation signal 81.

In the present embodiment, an operation mode of the power module 2 is detected by the detection module 6 while the processing module 3 is capable of storing at least one the route data 91 within the memory module 4 so as to permit the operation module 5 to select a respective one of the route data 91 from the memory module 4 for transmitting the control signal 82 corresponding to the respective one of the route data 91 to the power module 2 such the chair body 1 is driven based on the route data 91.

Figure 9:
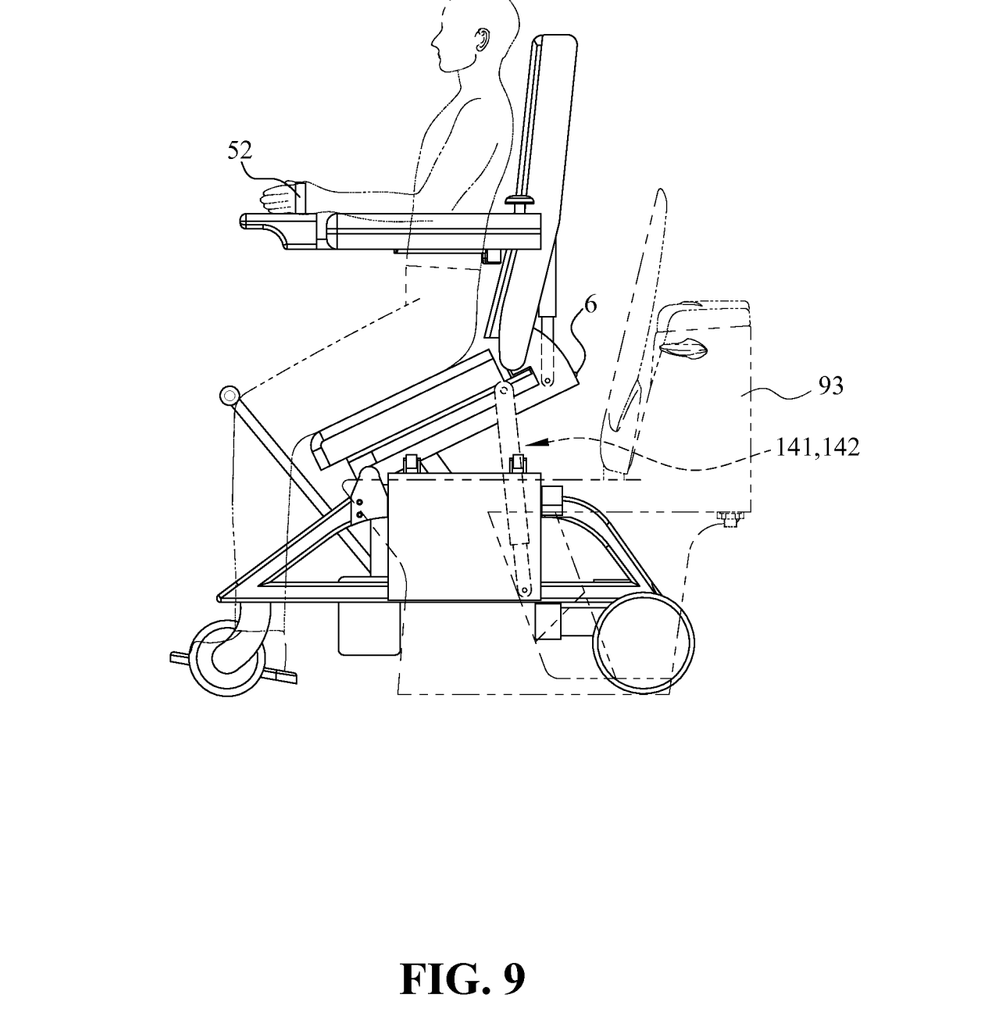
Figure 10:
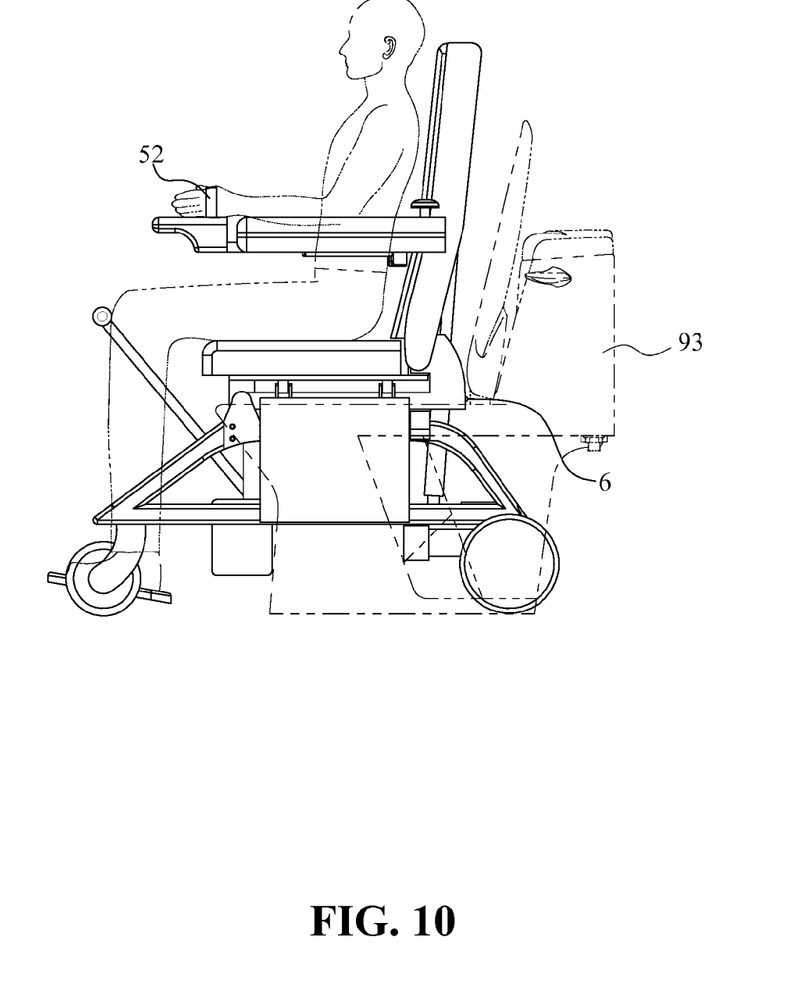

The seat 11 has left and right seat parts 111, 112 disposed side by side above the frame 14 and are operable by the operation module 5, which transmits an operation signal 84 to the processing module 3 in such a manner that the left and right seat parts 111, 112 are moved by the power module 2 so as to be separated relative to each other along a horizontal direction so as to expose the toilet access 15 (see FIG. 3). More specifically, the processing module 3 is disposed on the frame 14 and under the right seat part 112. The power module 2 includes a third power module 23 and a forth power module 24. The third power module 23 is electrically connected to the processing module 3 by a wire 233 or a wireless system and includes a third electrical motor 231 connected to the left seat part 111, and a third battery 232 electrically connected to the third electrical motor 231 and supplied power to the third electrical motor 231. The forth power module 24 is electrically connected to the processing module 3 by a wire 243 or a wireless system and includes a forth electrical motor 241 connected to the right seat part 112, and a forth battery 242 electrically connected to the forth electrical motor 241 and supplied power to the forth electrical motor 242. The operation module 5 includes a control lever 52 electrically connected to the processing module 3 by a wire 83 and is disposed on one of the armrests 12, as shown in FIG. 2. After the operation module 5 transmits the operation signal 84 to the processing module 3, the processing module 3 transmits the control signal 82 to the third and forth power module 23, 24, and the third and forth electrical motors 231 and 241 move the left and right seat parts 111 and 112 to separate relative to each other along the horizontal direction so as to expose the toilet access 15. Under this condition, the operator of the wheelchair of the present invention can use the toilet 93 (see FIG. 9).

More preferably, the seat 11 has a front end connected pivotally to the frame 14 and a rear end connected pivotally to the backrest 13. The frame 14 further includes first and second lifting structures 141, 142 installed at a predetermined position of the chair body 1 and electrically connected to the processing module 3 by wires 144, 145 or wireless systems such that the first and second lifting structures 141, 142 are adapted to be activated by the processing module 3 to form a desired angle between the seat 11 and the backrest 12 as best shown in FIG. 4 so as to assist the user to stand up or making proper body adjustment. To be more specific, the first and second lifting structures 141, 142 are telescopically connected hydraulic tubes having upper ends connected pivotally to the backrest 13 and lower ends connected pivotally to a seat support 143 of the frame 14 in such a manner that the first and second lifting structures 141, 142 are adapted to be activated by the processing module 3 to form a desired angle between the seat 11 and the backrest 13 or align the seat 11 and the backrest 13 relative to each other, in turn, assists the disabled person to standup while holding the armrests 12 (see FIG. 4). Also note that the backrest 13 is constructed ergonomically so as to form comfortable back support for the user.

The wheelchair of the present invention further includes a knee support unit 16 disposed at a front end of the frame 14. In this embodiment, the knee support 16 includes a rod 161, a cross bar 162, a left soft cover 163 and a right soft cover 164. One end of the rod 161 is pivotally connected to the front end of the frame 14, the other end of the rod 161 is connected to a central portion of the cross bar 162 and divides the cross bar 162 into a left portion sleeved in the left soft cover 163, and a right portion sleeved in the right soft cover 164.

In this embodiment, the power module 2 further includes a first power module 21 and a second power module 22. The plurality of wheels 17 includes a first rear wheel 171 operable by the first power module 21, a second rear wheel 172 operable by the second power module 22 via the detection module 6, a first front wheel 173 and a second front wheel 174. More specifically, the first power module 21 is electrically connected to the processing module 3 by a wire 213 or a wireless system and includes a first electrical motor 211 driven the first rear wheel 171 to rotate, and a first battery 212 electrically connected to the first electrical motor 211 and supplied power to the first electrical motor 211. The second power module 22 is electrically connected to the processing module 3 by a wire 223 or a wireless system and includes a second electrical motor 221 driven the second rear wheel 172 to rotate, and a second battery 222 electrically connected to the second electrical motor 221 and supplied power to the second electrical motor 221.

Figure 12:
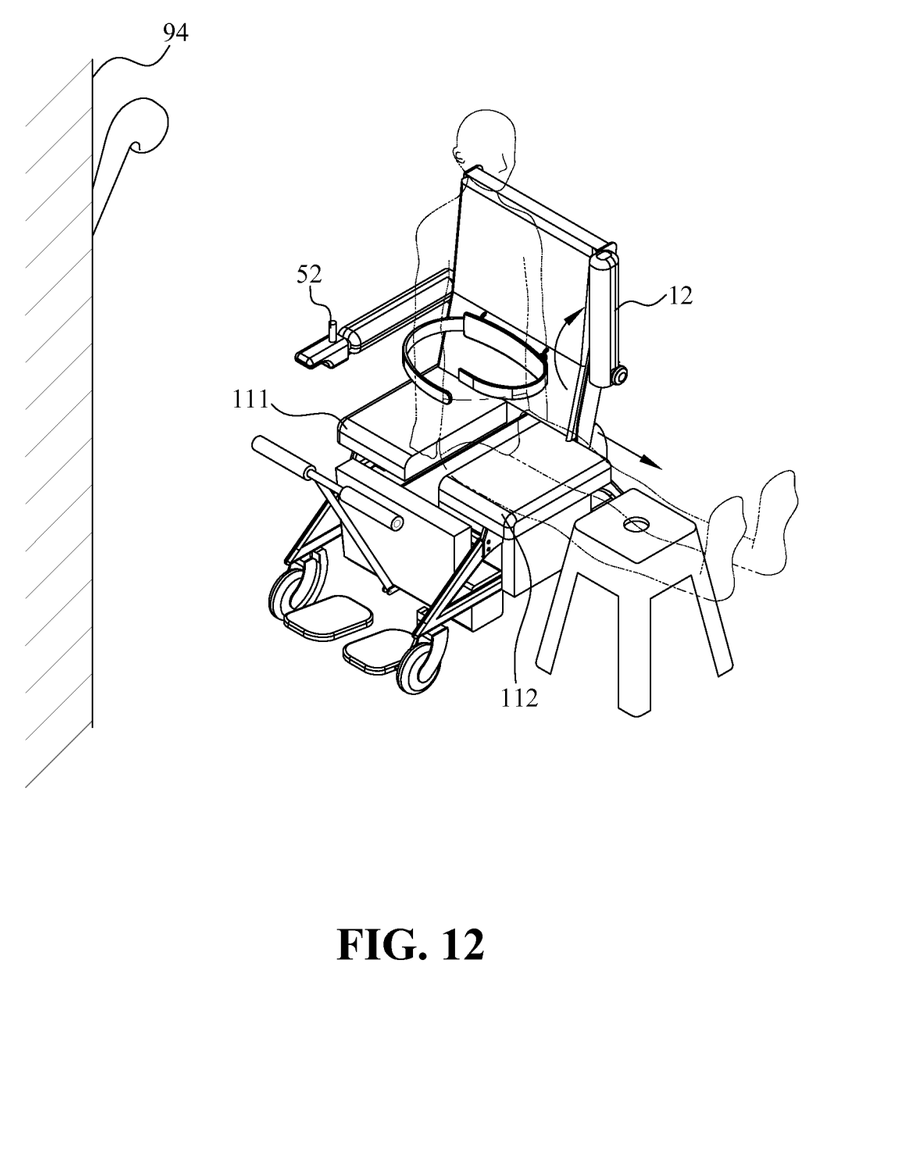

The armrests 12 are movable relative to the backrest 13 manually or via the processing module 3. More specifically, the armrests 12 are movable relative to the backrest 13 to a first position, where the armrests 12 extend perpendicularly and outwardly from the backrest 13, as best shown in FIG. 2. At the first position, if he wishes, the disabled person can rest his arms thereon while the seat 11 and the backrest 13 are simultaneously lifted upward by the first and second lifting structures 141, 142, thereby assisting the disabled person to stand up. Alternately, the armrests 12 are movable relative to the backrest 13 to a second position, where the armrests 12 are generally flush with the backrest 13. FIG. 12 illustrates one armrest 12 is located at the second position, the disabled person (shown by dotted lines) can lean his body on the other armrest 12 while he uses the toilet or taking a shower. Note that if the armrests 12 are movable relative to the backrest 13 via the processing module 3, the armrests 12 are electrically connected to the processing module 3 by a wire 121 or a wireless system.

An important aspect to note is that in order to permit access of the toilet 93 (see FIG. 9) into the toilet access 15, the frame 14 defines a hollow space below the seat 11 and the power module 2 is installed at lateral side of the chair body 1 while the other modules are also installed in the same manner.

Another important aspect to note is that the processing module 3 includes a processor for processing the route data 91, thereby converting into the control signal 82 for inputting into the power module 2 to control the activation of the chair body 1.

Figure 5:
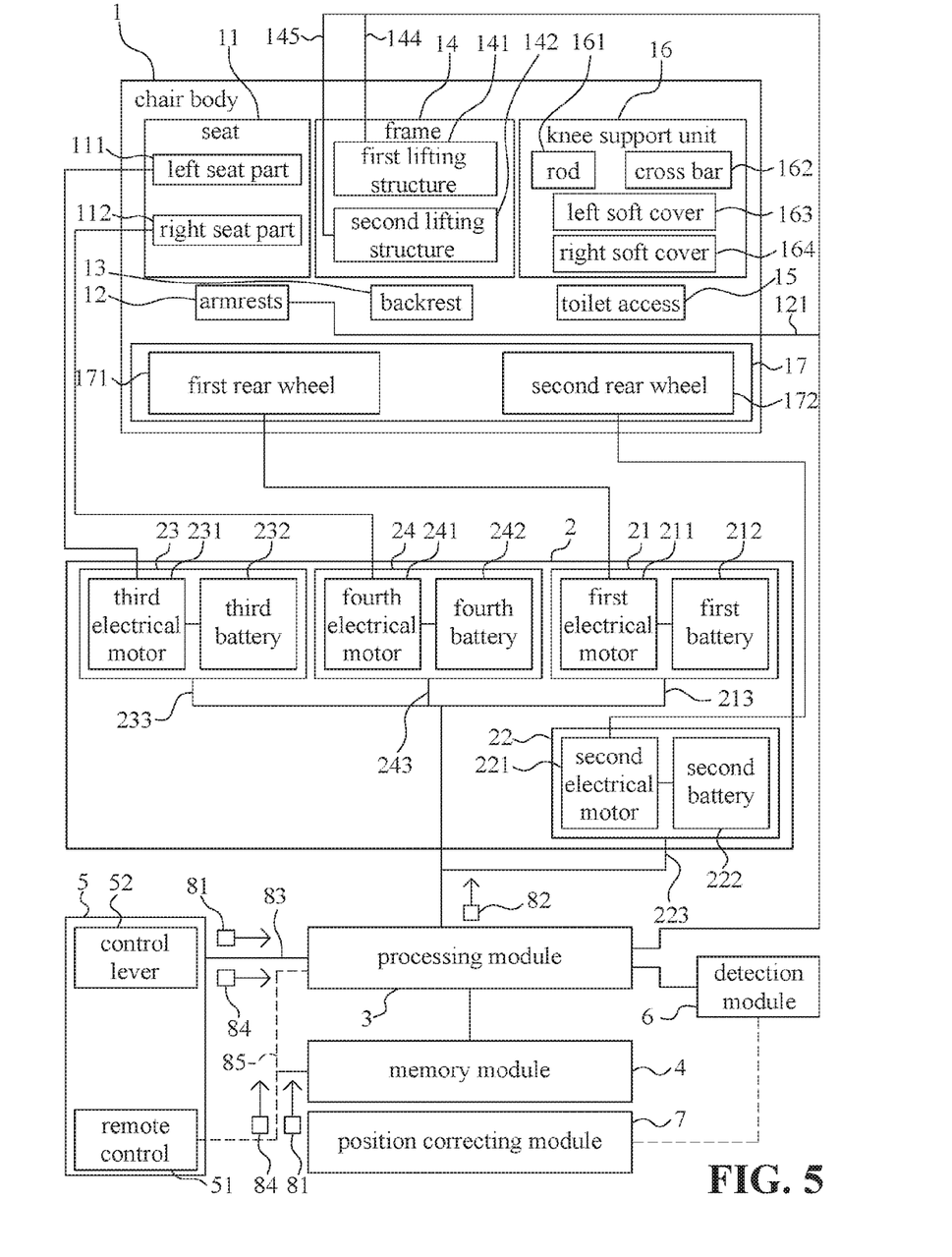
FIG. 5 shows a diagram representing elements of a self operable wheelchair system of the present invention.
Figure 6:
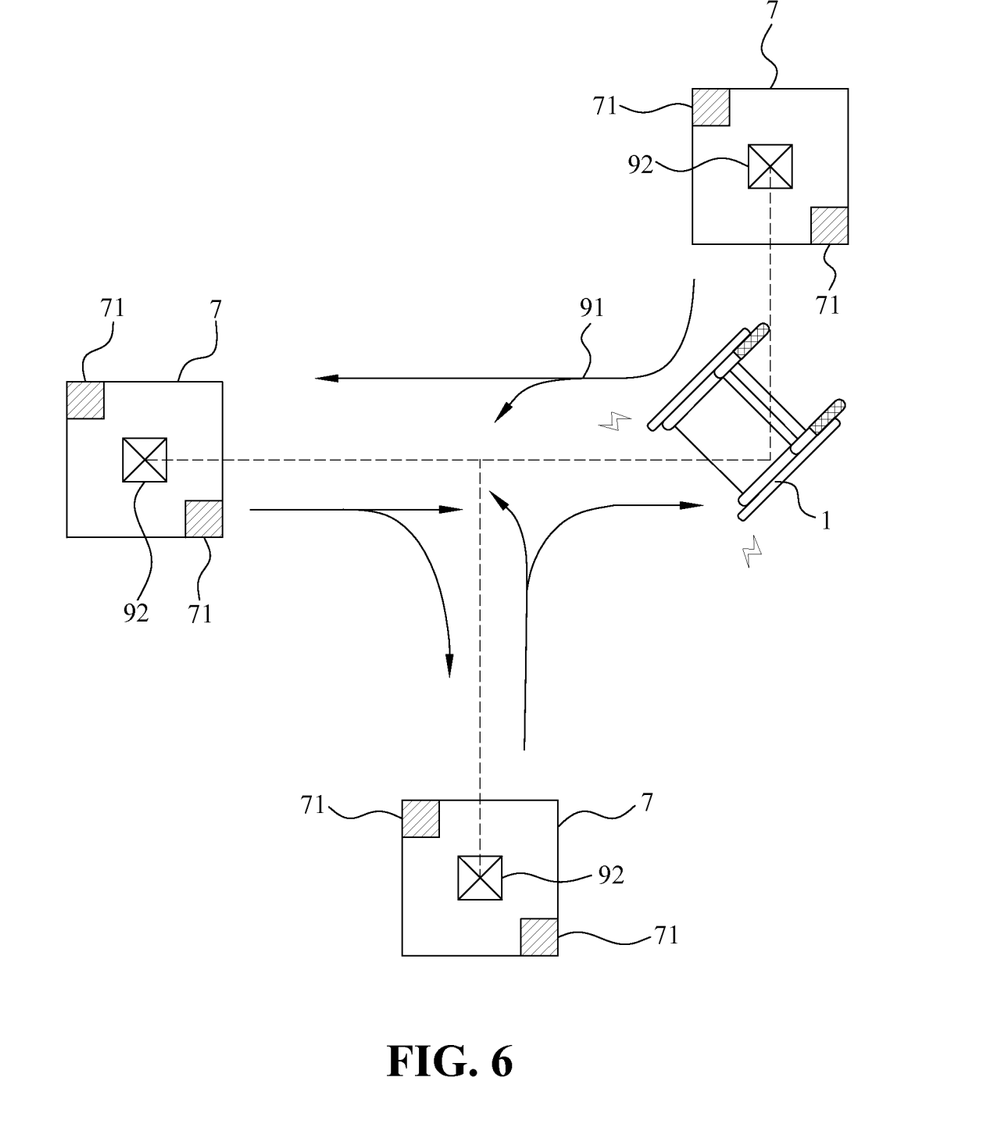
FIG. 6 shows a planar view illustrating how the wheelchair of the present invention is guided from its initial position into a designated position.
Figure 7:
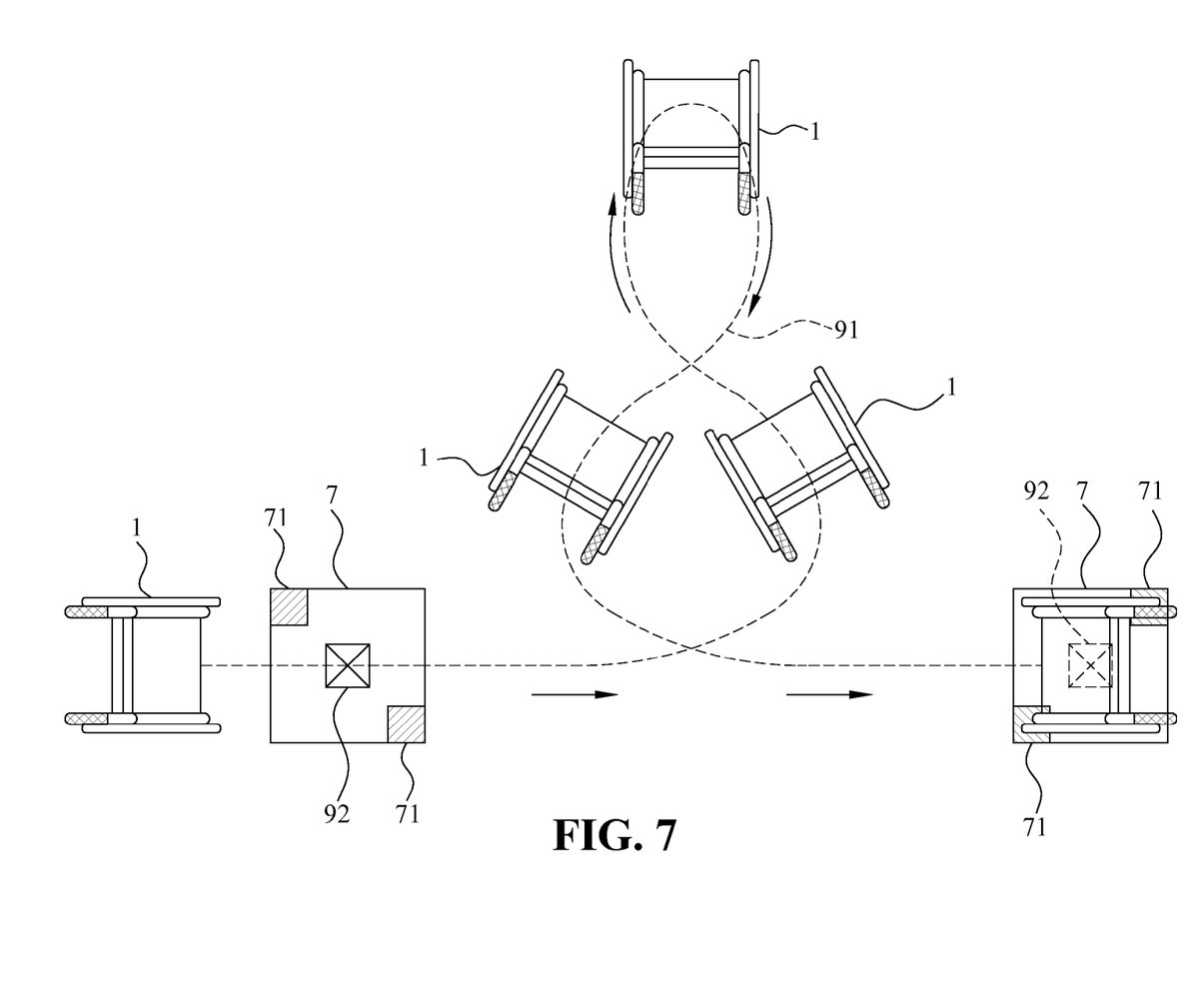
FIGS. 7~10 respectively illustrate how the wheelchair of the present invention is guided from its initial position into a toilet by utilizing a position correcting module employed in the wheelchair.

Referring to FIGS. 5 to 12, wherein FIG. 5 shows a diagram representing elements of a self operable wheelchair system of the present invention; FIG. 6 shows a planar view illustrating how the wheelchair of the present invention is guided from its initial position into a designated position; FIGS. 7~10 respectively illustrate how the wheelchair of the present invention is guided from its initial position into a toilet by utilizing a position correcting module employed in the wheelchair; and FIGS. 11 and 12 respectively illustrate how the wheelchair of the present invention is guided from its initial position into a bathroom by utilizing the position correcting module employed in the wheelchair.

The self operable wheelchair system of the present invention includes the above elements and their functions are the same so that a detailed description thereof is omitted herein for the sake of brevity. However, the wheelchair system of the present invention further includes a position correcting module 7 defining an initial position of said chair body 1. The detection module 6 is disposed at a rear end of the seat support 143 of the frame 14 and detects the position correcting module 7 to memorize the initial position of the chair body 1.

Referring to FIG. 6, in this embodiment, the processing module 3 is capable of sensing an operation mode of the power module 2 through the detection module 6 and recognizing the initial position 92 of the chair body 1 through the detection module 6 to detect the position correcting module 7 and combining both so as to form the route data 91 and storing in the memory module 4. Upon desired, the operation module 5 is capable of selecting a respective one of the route data 91 from the memory module 4 for transmitting the operation signal 81 corresponding to the respective one of the route data 91 to the first and second power module 21, 22 of the power module 2 such that the first and second wheels 171, 172 of the chair body 1 are driven based on the respective one of the route data 91, thereby permitting the chair body 1 to move along a preset route. In this embodiment, the wheelchair system of the present invention includes three position correcting modules 7, each of which includes two magnetic stones 71 defining an initial position 92. The detection module 6 is capable of detecting varying magnetic fields 72 of the magnetic stones 71 of the position correcting modules 7 so as to determine the initial positions 92 of the chair body 1.

FIGS. 7~10 respectively illustrate how the wheelchair of the present invention is guided from its initial position 92 into a toilet by utilizing the position correcting module 7. In this embodiment, two position correcting modules 7 are used such that upon the chair body 1 is moved to a first position correcting module 7, the chair body 1 senses the initial position 92 owing to the route data 91 which is stored in advance and continues its traveling action until it reaches to an another position correcting module 7, where the chair body 1 senses another initial position 92, that is the chair body 1 is by this time is located above the toilet 93 (the designated position). In other words, movement of the chair body 1 along the predetermined path permit the toilet 93 to extend into the toilet access 15 of the chair body 1. To facilitate extension of the toilet 93 into the toilet access 15, the disabled person can operate the operation module 5 so as to activate the first and second lifting structures 141, 142 such that the seat 11 as well as the backrest 13 are simultaneously lifted upward to as to permit and facilitate extension of the toilet 93 into the toilet access 15 (see FIG. 9). Afterward, the first and second lifting structures 141, 142 can be lowered so as to dispose the seat 11 stably above the toilet 93. At this time, the operation module 5 is again manipulated in such a manner to move the left and right seat parts 111, 112 away from each other so as to expose the toilet 93, thereby facilitating the disabled person to use the toilet 93.

Figure 11:
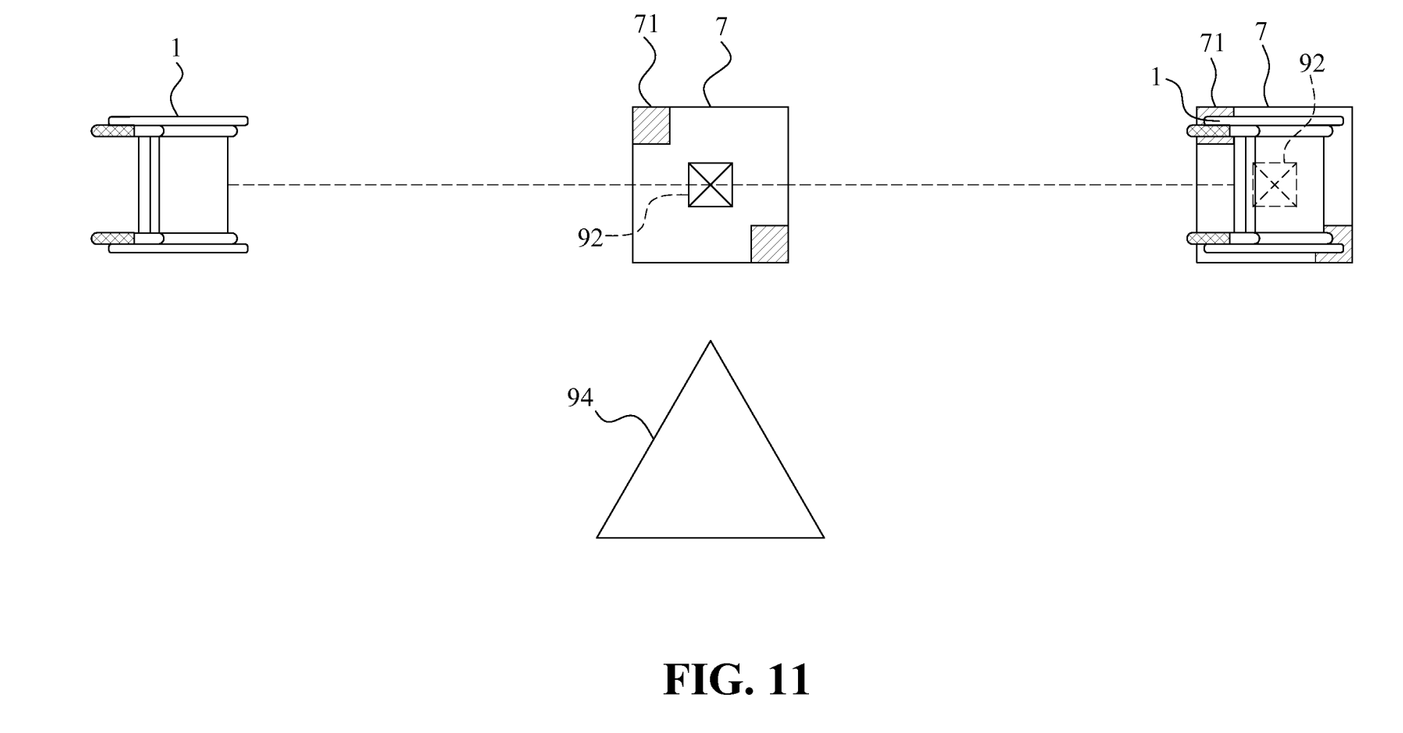
FIGS. 11 and 12 respectively illustrate how the wheelchair of the present invention is guided from its initial position into a bathroom by utilizing the position correcting module employed in the wheelchair.

FIGS. 11 and 12 respectively illustrate how the wheelchair of the present invention is guided from its initial position into a bathroom by utilizing the position correcting module employed in the wheelchair. In the same manner, more than two position correcting modules 7 are used such that upon the chair body 1 is moved to the designated position, the disabled person can manipulate the operation module 5 in such a manner to rotate the armrests 12 relative to the backrest 13 between first and second positions. In other words, one armrest 12 can be rotated to the first position while the other armrest 12 can be rotated to the second position as best shown in FIG. 12. At this time, the disabled person can stretch his legs over a nearby chair (as shown by dotted lines), thereby facilitating the disabled person to take a shower upon opening the water tap 94.

Figure 13:
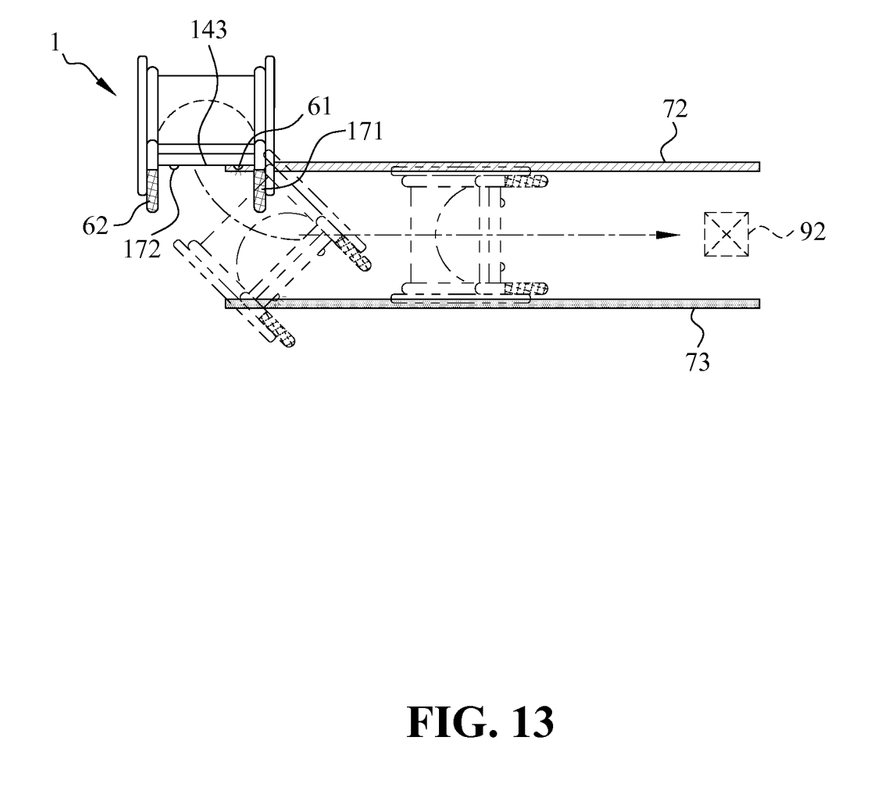
FIG. 13 illustrates how the wheelchair of the present invention is guided from its initial position into a toilet by utilizing first and second color standard sensors of a detection module to detect first and second tapes of the position correcting module employed in the wheelchair.

Referring to FIG. 13, in another embodiment, the position correcting module 7 includes a first tape 72 and a second tape 73. The first and second tapes 72, 73 are black or other color. The first and second tapes 72, 73 are disposed on the ground and parallel to each other. The first and second tapes 72, 73 define the initial position 92 of the chair body 1. The detection module 6 includes a first color standard sensor 61 disposed at the rear end of the seat support 143 of the frame 14 close to the first rear wheel 171, and a second color standard sensor 62 disposed at the rear end of the seat support 143 of the frame 14 close to the second rear wheel 172. While the chair body 1 is driven in reverse and the first color standard sensor 61 detects the first tape 72, the first color standard sensor 61 transmits a signal to the processing module 3. The processing module 3 sends a signal to the first power module 21 to stop the first electrical motor 211 driving the first rear wheel 171 so that the first rear wheel 171 stops rotating at once. At the meantime, the second electrical motor 221 is still driving the second rear wheel 172 to rotate, so the chair body 1 can turn into an area between the first and second tapes 72, 73. While the second color standard sensor 62 detects the second tape 73, the second color standard sensor 62 transmits a signal to the processing module 3. The processing module 3 sends an activation signal to the first power module 21 to activate the first electrical motor 211 driving the first rear wheel 171 to rotate again thereby moving the chair body 1 toward the initial position 92 straight ahead.

An import aspect to note is that the operation module 5 further includes a remote control 51 compatible with one of WIFI, infrared, Bluetooth wireless systems 85 for establishing communication with the chair body 1 such that movement of the chair body 1 can be easily controlled by the disabled person using the remote control.

Although the present invention has been described with reference to the preferred embodiments thereof, it is apparent to those skilled in the art that a variety of modifications and changes may be made without departing from the scope of the present invention which is intended to be defined by the appended claims.

What is claimed is:
1. A self operable wheelchair comprising:
   a chair body including a plurality of wheels for moving about, a seat, a pair of armrests, a backrest, a frame and a toilet access, wherein said seat is adapted to be seated over a toilet once the toilet is received in said toilet access;
   a power module electrically connected to at least one of said wheels for supplying power to move said chair body;
   a processing module electrically connected to said power module for processing at least one route data and converting the same into a control signal transmitted to said power module for controlling activation of said chair body;
   a memory module electrically connected to said processing module for storing and transmitting said route data to said processing module;
   a detection module electrically connected to said processing module and capable of detecting said route data of said chair body and transmitting said route data via said processing module so as to store within said memory module; and an operation module electrically connected to or remotely connected to said processing module for directly transmitting an operation signal to said processing module, which, in turn, activates said chair body based on said operation signal;

wherein, an operation mode of said power module is detected by said detection module while said processing module is capable of storing at least one said route data within said memory module so as to permit said operation module to select a respective one of said route data from said memory module for transmitting said control signal corresponding to said respective one of said route data to said power module such said chair body is driven based on said route data, wherein, said seat is operable by said processing module in such a manner to uncover and expose said toilet access or rotatable relative said frame so as to be lifted upward from said frame.

2. The self operable wheelchair according to claim 1, wherein said seat has left and right seat parts disposed side by side above said frame and are adapted to be separated relative to each other along a horizontal direction so as to expose the toilet access.

3. The self operable wheelchair according to claim 1, wherein said pair of armrests are movable relative to said backrest manually or via said process module.

4. The self operable wheelchair according to claim 3, wherein said pair of armrests are movable relative to said backrest between a first position, where said armrests extend perpendicularly and outwardly from said backrest and a second position, where said armrest are generally flush with said backrest.

5. The self operable wheelchair according to claim 1, wherein said seat has a front end connected pivotally to said frame and a rear end connected pivotally to said backrest, said frame further including first and second lifting structures installed at a predetermined position of said chair body such that said first and second lifting structures are adapted to be activated by said processing module to align said seat and said backrest relative to each other.

6. The self operable wheelchair according to claim 1, wherein said power module further includes a first power module and a second power module, said plurality of wheels including a first pair of wheels operable by said first power module and a second pair of wheels operable by said second power module via said detection module.

7. A self operable wheelchair system comprising;:
a chair body including a plurality of wheels, a seat, a pair of armrests, a backrest, a frame and a toilet access;
a power module electrically connected to at least one of said wheels for supplying power so as to move said chair body about;
a processing module electrically connected to said power module for processing at least one route data and converting the same into a control signal transmitted to said power module for controlling activation of said chair body;
a memory module electrically connected to said processing module for storing and transmitting said route data to said processing module;
a detection module electrically connected to said processing module and capable of detecting said route data of said chair body and transmitting said route data via said processing module so as to store within said memory module;

an operation module electrically connected to or remotely connected to said processing module for directly transmitting an operation signal to said processing module, which, in turn, activates said chair body based on said operation signal; and a position correcting module capable of defining an initial position of said chair body, said detection module to detect said position correcting module to memorize said initial position of said chair body;

wherein, said processing module is capable of sensing an operation mode of said power module through said detection module and recognizing said initial position of said chair body through said detection module to detect said position correcting module and combining both so as to form said route data and storing in said memory module and wherein said operation module is capable of selecting a respective one of said route data from said memory module for transmitting said control signal corresponding to said respective one of said route data to said power module such said chair body is driven based on said respective one of said route data, thereby permitting entry of the toilet into said toilet access such that said seat is seated over the toilet, wherein said seat is operable by said processing module in such a manner to uncover said toilet access or rotatable relative said frame so as to be lifted upward from said frame.

8. The self operable wheelchair system according to claim 7, wherein said seat has left and right seat parts disposed side by side above said frame and are adapted to be separated relative to each other along a horizontal direction so as to expose the toilet access.

9. The self operable wheelchair system according to claim 7, wherein said pair of armrests are movable relative to said backrest manually or via said process module.

10. The self operable wheelchair system according to claim 9, wherein said pair of armrests are movable relative to said backrest between a first position, where said armrests extend perpendicularly and outwardly from said backrest and a second position, where said armrest are generally flush with said backrest.

11. The self operable wheelchair system according to claim 7, wherein said seat has a front end connected pivotally to said frame and a rear end connected pivotally to said backrest, said frame further including first and second lifting structures installed at a predetermined position of said chair body such that said first and second lifting structures are adapted to be activated by said processing module to align said seat and said backrest relative to each other.

12. The self operable wheelchair system according to claim 7, wherein said operation module further includes a remote control compatible with one of WIFI, infrared, Bluetooth wireless systems for establishing communication with said chair body.

13. The self operable wheelchair system according to claim 7, wherein said position correcting module includes at least one magnetic stone, said detection module being an electromagnetic sensing element and being capable of detecting varying magnetic field of the magnetic stone of said position correcting module.

14. The self operable wheelchair system according to claim 7, wherein said position correcting module includes a first tape and a second tape, said detection module including a first color standard sensor disposed at a rear end of a seat support of said frame close to a first rear wheel of said chair body, and a second color standard sensor disposed at said rear end of said seat support of said frame close to a second rear wheel of said chair body, wherein, said first color standard sensor detects said first tape and transmits a signal to said processing module to control said power module to stop said first rear wheel of said chair body rotating and drive said second rear wheel of said chair body to rotate, until the second color standard sensor detects said second tape and transmits a signal to said processing module to control said power module to drive said first rear wheel of said chair body to rotate again thereby moving said chair body toward said initial position straight ahead.

* * * * *